April 14, 1970 D. I. POMERANTZ 3,506,424

BONDING AN INSULATOR TO AN INSULATOR

Filed May 3, 1967

INVENTOR
DANIEL I. POMERANTZ

BY Robert Levine

ATTORNEY

United States Patent Office 3,506,424

Patented Apr. 14, 1970

3,506,424

BONDING AN INSULATOR TO AN INSULATOR

Daniel I. Pomerantz, Lexington, Mass., assignor to P. R. Mallory & Co., Inc., Indianapolis, Ind., a corporation of Delaware Continuation-in-part of application Ser. No. 583,907, Oct. 3, 1966, which is a continuation-in-part of application Ser. No. 511,771, Dec. 6, 1965, which in turn is a continuation-in-part of application Ser. No. 453,600, May 6, 1965. This application May 3, 1967, Ser. No. 635,883

Int. Cl. C03b 29/04

U.S. Cl. 65—40 11 Claims

ABSTRACT OF THE DISCLOSURE

An inorganic electrical insulator material is bonded to another inorganic insulator material by placing the materials in close contact and applying a potential across the unit producing a low current through the composite, the insulator materials being heated to increase their electrical conductivity. One of the insulator materials particularly useful in the operation and article produced is a layer of silicon oxide which is bonded by the method to the other insulator. The silicon oxide may be performed on a substrate whereby the substrate remains permanently attached and forms part of the final unit. The process provides means for encapsulating electrical circuitry within the unit with feed-through electrical connections to the exterior.

This application is a continuation-in-part of application Ser. No. 583,907, filed Oct. 3, 1966, now Patent No. 3,397,278, granted Aug. 13, 1968, which in turn is a continuation-in-part of application Ser. No. 511,771, filed Dec. 6, 1965, which in turn is a continuation-in-part of application Ser. No. 453,600, filed May 6, 1965 both now abandoned.

THE PRIOR ART IN GENERAL

In the past insulators have been joined in various ways such as by application of temperature or pressure or a combination thereof. Also, glasses have been joined by fusion techniques to other glasses and various oxides such a SiO and $SiO_2$. One of the problems involved in bonding insulators by application of heat is that considerable stresses are built up by the bonding process. This is especially true with insulators such as glasses. Another problem has been that dimensional tolerances are hard to hold because of the molten phase resulting from the application of heat.

Another contemporary technique for joining insulators has been to metallize the surfaces of the insulators and to join the metallized surfaces by fusing or soldering techniques. This particular approach has the obvious disadvantage of the extra metallizing steps.

SUMMARY OF THE INVENTION

The present invention obviates various problems heretofore encountered in the prior art including those specifically noted above. It provides an effective method of bonding one inorganic insulator to another inorganic insulator wherein the insulators are placed in contact and a potential is applied across the sandwich, the insulators being heated to increase their electrical conductivity, and a small current passes through the sandwich. In the method the current may be of low value and the insulators are heated to a temperature below their respective softening points, the conditions being such that neither insulator is rendered molten. The invention includes, therefore, the bonded article of manufacture so formed without the fusing of the materials.

The invention comprises an ideal means for accomplishing tasks such as encapsulating thin film circuits, encapsulating monolithic integrated circuits, encapsulating semiconductor devices, laminating glasses and fabricating hermetically sealed feed-throughs.

In one of its more specific aspects the invention provides a method of bonding a glass insulator to a thin layer of material preformed on a substrate which may be still another insualtor or other material such as a metal. Accordingly it is an object of the invention to provide a novel method for bonding a variety of glasses and metals to glass by means of an intermediary layer formed on one of the elements designated the substrate, particularly a layer formed by evaporation of SiO on the substrate or the layer may be silicon nitride formed on the substrate by methods well known in the art.

Other objects of the invention and the nature thereof will become apparent from the following description considered in conjunction with the accompanying drawings and wherein like reference numbers describe elements of similar function therein and wherein the scope of the invention is determined rather from the accompanying claims.

DESCRIPTION OF THE DRAWINGS

Referring now to FIGURE 1 disclosing in diagrammatic form one simple application of the invention there is shown a sandwich comprising an insulator 10, and insulator layer 11 and a member 12 which latter may be either an insulator or a material of relatively high conductivity such as a metal. A particularly effective insulator 11 is a layer or film of silicon oxide which has been formed by evaporation of silicon monoxide on the surface of the element 12 in accordance with methods well known in the art. The exact composition of layer 11 may vary dependent upon conditions and is not readily determinable but is believed to contain in addition to SiO varying amounts of $SiO_2$ and it will be referred to generally herein as silicon oxide. In the case where the substrate 12 is silicon the layer may be formed in situ during the fabrication of the silicon element. The oxide layer may be relatively thin in the range of a few thousand angstroms. The thickness of the insulator layer is not critical and may vary within reasonable limits dependent upon conditions. Likewise the thickness of the elements 10 and 12 may vary considerably. The limit as to thinness is the only one which requires particular consideration it being governed by the capability of handling preparatory to bonding. The insulators are heated to render them more electrically conductive and in the practice of the invention the temperature will vary dependent upon the type or specific composition of the insulator material, but in general will be in the range of 150° C. to 1200° C. When the insulator is a borosilicate glass such as the type obtainable from the Corning Glass Works under the trademark "Pyrex" the preferred range is about 300° C. to 700° C. For the soft glasses the temperature will be in the range of about 150° C. to 600° C., and for quartz glass the temperature will be in the high range of about 600° C. to about 1200° C. In every case the upper limit will be below the softening point of the particular glass. The heating of the insulators may be effected in any suitable way such as through the medium of a platen 13 upon which the unit is supported, the platen comprising a conductive element embodying an electrical resistance heater connected to an electrical source through the terminals 14 and 15. Other means may be employed, however, such as by electrical induction or inserting the unit in a furnace or oven heated in any suitable manner.

Figure 1:
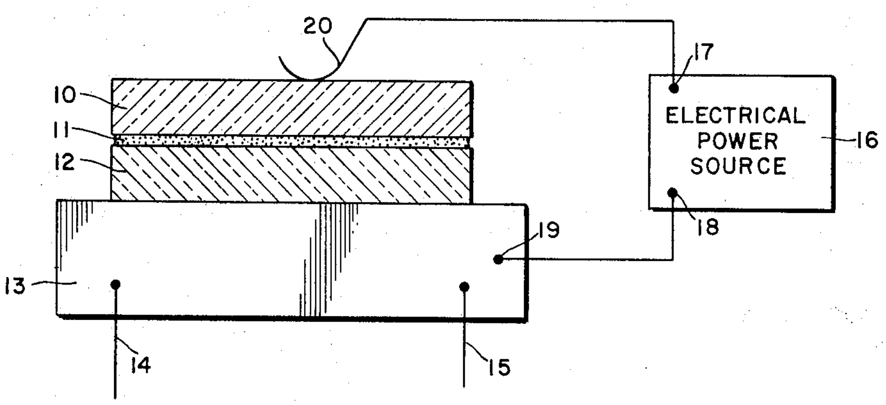
FIGURE 1 is a side view in section of a simplified system for bonding an insulator to a substrate through the medium of an intermediary layer formed on the substrate.

As indicated in FIGURE 1 an electrical potential is applied across the composite unit this being accomplished through a power source 16 having a terminal 18 connected at 19 to the metal platen 13 and the opposite terminal 17 of the power source being connected through a terminal 20 to the upper insulator 10. The terminal 20 may be in direct contact with the insulator element 10 or if desired it may be spaced a small distance therefrom in the order of about 1 mm. whereby a high field develops between the terminal 20 and the member 10 which ionizes the air so that current passes. The electrical power preferably in most cases is a direct current source, but may be a pulsating direct current source, or in some cases an alternating current power source, particularly of a low frequency.

The type of power source and in the case of direct current, the polarity as applied to the unit may depend in some cases upon the type of glass being operated upon and particularly whether the glass has a symmetrical potential distribution characteristic or an asymmetrical potential distribution characteristic as described in detail in the copending application of Pomerantz, Wallis and Dorsey, Ser. No. 620,794 filed Mar. 6, 1967, entitled "Bonding Electrically Conductive Metals to Insulators," said prior application having a common assignee with the present application. As noted in said prior application potential distribution characterstics for insulators and methods for determining them are well known and fully documented in the literature, citations to several publications being given. The borosilicate glasses in general and particularly Pyrex No. 7740 are asymmetrical in character and for optimum bonding where the insulator 10, for example, is Pyrex the contact 20 should be made negative. If the insulator 10 should be asymmetrical but in the opposite direction from Pyrex glass No. 7740 then the contact 20 should usually be connected to the positive terminal of the power source 16. Where the insulator 10 has a symmetrical distribution characteristic the polarity may be in either direction.

As described in my aforenoted prior application Ser. No. 583,907, although the exact phenomenon which occurs in the bonding operation is not readily determinable it is believed to be due principally to an electrostatic force which is generated at the interface between the elements when a potential is applied across the assembled unit. When elements are brought together, even though they have very smooth complemental surfaces, there is initially intimate contact at only spaced points with intervening gaps. Then when the potential is applied across the unit and electric current flow ensues, electrostatic attractive forces draw the materials together progressively closing the gaps. The heating of the insulators increases their electrical conductivity and promotes the generation of the electrostatic forces and the bonding.

The applied voltage, the current density and the time are not critical and may vary within wide ranges. In general the potential will be in the range of a few hundred volts up to perhaps 2000 volts. No very definite value for the current density can be stated particularly since, if the applied potential is maintained constant, the current density gradually decreases from, for example, a value in the range of 100 to 300 or more microamperes/cm.$^2$ to a very small value as the bond progresses. In general a finite current of low value serves the purpose. The higher the potential and corresponding current the lesser the time required and conversely. As a practical matter the current commonly will be in the range 3 to 20 microamperes/mm.$^2$ and the time in the range of 1 to 3 minutes.

The following are representative examples of bonding an inorganic insulator to aonther inorganic insulator in accordance with the invention reference being made to FIGURE 1 as illustrating diagrammatically the physical set-up.

In one example in accordance therewith the insulator 10 was a substantially alkali-free hard glass designated by the Corning Glass Works as No. 7059 and the substrate 12 was Pyrex No. 7740 on which there had been deposited by evaporation of SiO an adherent silicon oxide coating. The No. 7059 glass was 2 mils thick and the Pyrex No. 7740 was 20 mils. The silicon oxide film had a thickness within the range of 2000 to 5000 angstroms commonly employed. The unit was heated to a temperature of about 600° C. to 700° C. A direct current source 16 was connected across the sandwich with the glass No. 7059 negative the applied voltage being about 1000 volts producing a small current. A good bond was effected between the No. 7059 glass and the insulator layer 11 in about 3 minutes. The glass No. 7059 has a substantially symmetrical potential distribution characteristic and similar results were obtained with the applied potential reversed. Likewise similar results are obtainable employing quartz glass as the element 10.

In another example both elements 10 and 12 were Pyrex No. 7740 of 10 mils thickness with an intervening layer of silicon oxide deposited on the substrate 12. The unit was heated to about 500° C. and a potential applied for about 3 minutes from a direct current source with the Pyrex element 10 negative producing a current of about 20 microamperes/mm.$^2$ In an example where the substrate 12 was the metal molybdenum carrying the layer 11 having a thickness of about 5000 angstroms formed by evaporation of SiO, and the insulator 10 was Pyrex No. 7740 having a thickness of 10 mils, the insulators were heated to a temperature of about 500° C. and a bond was effected by the application of a direct current of about 20 microamperes/mm.$^2$ for about 3 minutes, the Pyrex being made negative.

Bonding was effected under generally similar conditions except that the substrate 12 was nickel instead of molybdenum. In one operation the silicon oxide layer was about 2000 angstroms thick and in another about 8500 angstroms.

In still another example the substrate 12 was silicon 10 mils thick having formed thereon an adherent layer of silicon nitride about 2000 angstroms thick. The insulator 10 was Pyrex No. 7740 having a thickness of 10 mils which was heated to about 500° C. A potential was applied from a direct current source with the Pyrex element 10 negative and a current passed of about 3 microamperes/mm.$^2$ for about 1 minute.

Figure 2:
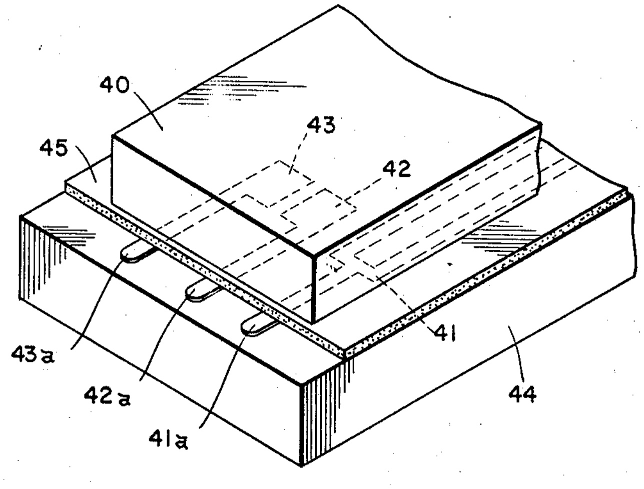
FIGURE 2 is a view in perspective illustrating the application of the principles of the invention wherein a protective glass cover is bonded over a thin film circuitry and arranged to provide hermetically sealed feed-throughs to the circuitry.

FIGURE 2 is an illustrative example of the application of the invention in encapsulating a circuitry and providing sealed feed-throughs. In this application a sheet of glass 40 is bonded over a thin film circuitry indicated diagrammatically at 41, 42 and 43 deposited on a substrate 44 by any suitable method well known in the art. A silicon oxide film 45 is deposited by evaporation of SiO over the circuitry and the insulator sheet 40 is bonded to the silicon oxide film 45 by the methods of the present invention. The circuitry elements 41, 42, 43 have exposed terminal conductors 41_a_, 42_a_ and 43_a_ respectively. It can be seen, therefore, that the circuitry has hermetically sealed feed-throughs connecting the protected circuitry to the outside environment. Many other similar applications can be worked out within the principles of the present invention and the boundaries of the present disclosure.

The insulator materials employed and the conditions for bonding the insulator 30 to the layer of silicon oxide 35 may vary depending upon the circumstances and may be in accordance with any one of the examples described above in connection with FIGURE 1, such as the example wherein both the substrate having thereon the silicon oxide layer and the top insulator are Pyrex No. 7740.

It will be understood that the particular examples heretofore given are illustrative and many variations therefrom may be employed. Specific examples of borosilicate glasses and hard glasses have been mentioned. Other substrates can be employed such as quartz and ceramics. Several laminations may be fabricated employing an intermediate layer of silicon oxide or silicon nitride material. In addition to the examples described Pyrex may be laminated with various metals such as aluminum, nickel and gold. Also Pyrex may be laminated with Karma, the latter being the trade name for a resistive material including nickel, chrome, aluminum and iron.

The bonding method and the articles of the present invention, as hereinbefore described, are merely illustrative and not exhaustive in scope. Since many widely different embodiments of the invention may be made without departing from the scope thereof, it is intended that all matter contained in the above description and shown in the accompanying drawings shall be interpreted as illustrative and not in a limiting sense.

I claim:

1. A method of bonding a first insulator of inorganic material to a second insulator of inorganic material comprising:

juxtaposing said materials in surface contact relationship, heating said materials to a temperature below their softening points to increase their electrical conductivity, and applying an electric potential across the juxtaposed insulator materials, said potential being sufficient to produce a finite electric current of low amperage density through the juxtaposed insulator materials without rendering said materials molten thereby to produce an electrostatic field across the adjoining surfaces to effect a bond between the insulator materials.

2. A method in accordance with claim 1 wherein the insulator materials are heated to a temperature in the range of 150° C. to 1200° C.

3. A method in accordance with claim 1 wherein one of said materials is silicon oxide.

4. A method in accordance with claim 1 wherein one of said materials is a glass.

5. A method in accordance with claim 1 wherein one of said materials is silicon nitride.

6. A method of bonding a first inorganic insulator material to a substrate comprising:

applying a thin adherent layer of inorganic insulator material to said substrate, juxtaposing said first insulator material in surface contact relationship with said inorganic layer, heating said contacting insulator materials to a temperature below their softening points to increase their electrical conductivity, and applying an electric potential across the juxtaposed insulator materials, said potential being sufficient to produce a finite electric current of low amperage density through the juxtaposed insulator materials without rendering said materials molten thereby to produce an electrostatic field across the adjoining surfaces to effect a bond between the insulator materials.

7. A method in accordance with claim 6 wherein said layer is silicon oxide.

8. A method in accordance with claim 6 wherein said layer is silicon nitride.

9. A method in accordance with claim 6 wherein said first insulator is glass.

10. As an article of manufacture, an inorganic insulator material bonded to another inorganic material, said article formed according to the process of claim 1.

11. As an article of manufacture, an inorganic insulator material bonded to a substrate, said article formed according to the process of claim 6.

References Cited

UNITED STATES PATENTS

| | | | |
|---|---|---|---|
| 2,306,054 | 12/1942 | Guyer | 65—40 |
| 3,256,598 | 6/1966 | Kramer et al. | 156—272 X |
| 3,397,278 | 8/1968 | Pomerantz | 156—272 X |

S. LEON BASHORE, Primary Examiner

R. L. LINDSAY, Jr., Assistant Examiner

U.S. Cl. X.R.

65—43; 156—272, 273; 161—193; 174—52